May 29, 1934.  F. MARASSO  1,960,342
BREAD WRAPPING TABLE
Filed Oct. 29, 1932  2 Sheets-Sheet 1

Inventor:
Fred Marasso,
by Charles O. Shurvey
his Atty

May 29, 1934.  F. MARASSO  1,960,342
BREAD WRAPPING TABLE
Filed Oct. 29, 1932  2 Sheets-Sheet 2
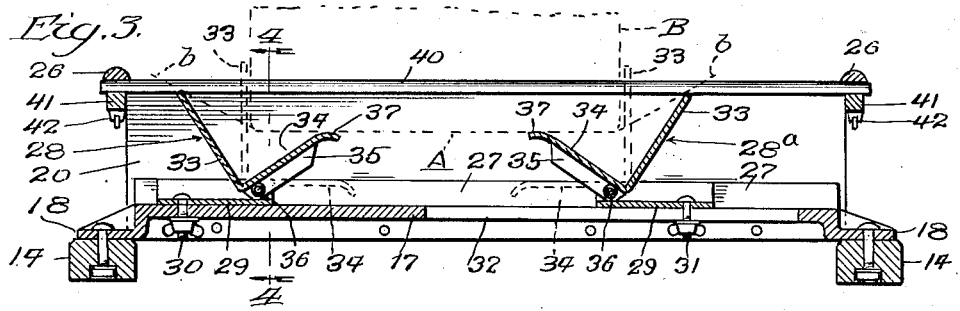
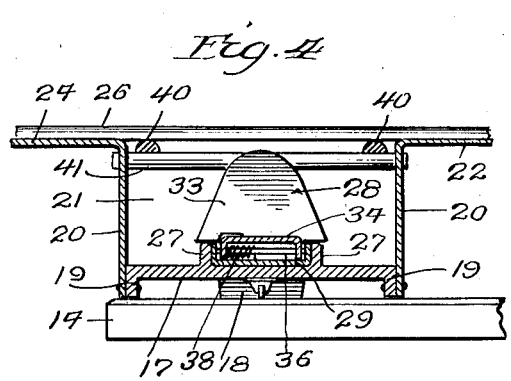
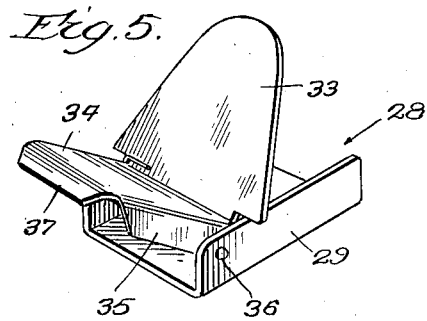
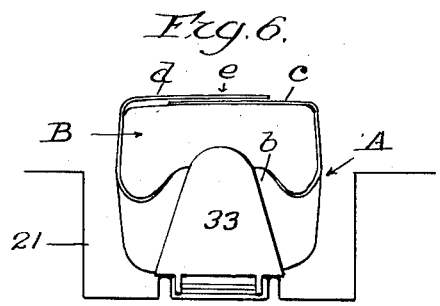
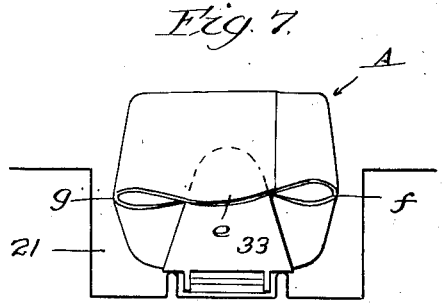
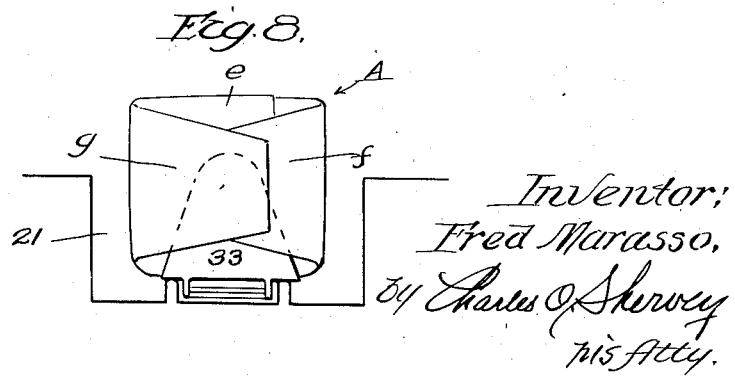
Inventor;
Fred Marasso,
by Charles O. Shirvey
his Atty.

Patented May 29, 1934

1,960,342

UNITED STATES PATENT OFFICE 1,960,342

BREAD WRAPPING TABLE

Fred Marasso, Joliet, Ill., assignor to Union Machinery Company, Joliet, Ill., a corporation of Illinois Application October 29, 1932, Serial No. 640,255

11 Claims. (Cl. 93—2)

This invention relates to bread wrapping tables and its principal object is to provide a simple, practical and comparatively inexpensive table, for use in connection with a sealing machine, upon which an attendant may easily and quickly wrap sliced or unsliced loaves of bread before placing them in the sealing machine. Waxed or paraffin paper is usually used for wrapping loaves of bread and when a loaf, wrapped in such paper, is placed in the sealing machine, the bottom and ends of the wrapper are heated, and thereafter cooled, thereby effecting the sealing operation.

The invention has been especially devised for wrapping sliced loaves of bread, but its use is not limited thereto as it may be used equally as well for wrapping whole loaves of bread or other commodities.

Another object of the invention is to provide a table with a trough having end flaps folders therein adapted to automatically fold up flaps at the ends of the loaf and retain the folded flaps in place during the manual operation of making the remaining folds. When used for wrapping sliced loaves of bread, the flap folders also serve to hold the sliced loaf under slight pressure, whereby the loaf can be wrapped tighter and a firmer package can be obtained.

Other objects and advantages will appear in the following specification, and with said objects and advantages in view, this invention consists in the several novel features hereinafter fully set forth and claimed.

The invention is clearly illustrated in the accompanying drawings in which

Fig. 3 is a vertical cross section taken on the line 3—3 of Fig. 1;

Fig. 4 is a detail vertical longitudinal section taken on the line 4—4 of Fig. 3;

Fig. 5 is a perspective view of one of the first flap folders and

Figs. 6, 7 and 8 are diagrammatic views, in end elevation, illustrating steps taken in wrapping a loaf of bread.

Figure 1:
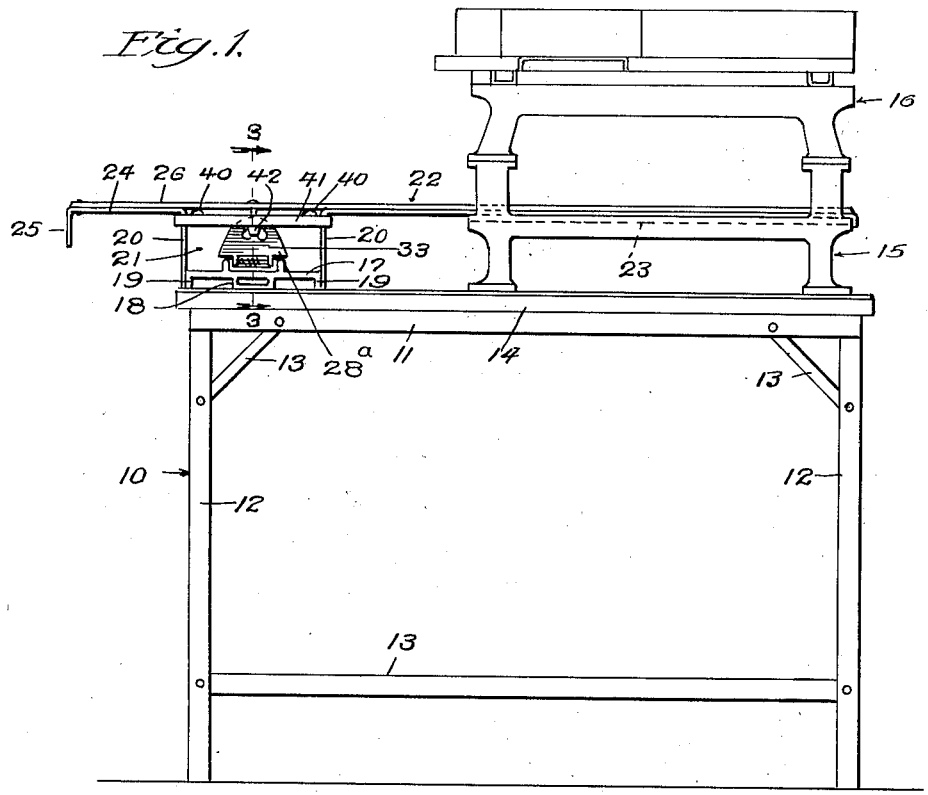
Fig. 1 is a side elevation of a bread wrapping table embodying a simple form of the present invention, the view showing also a sealing machine in connection therewith.
Figure 2:
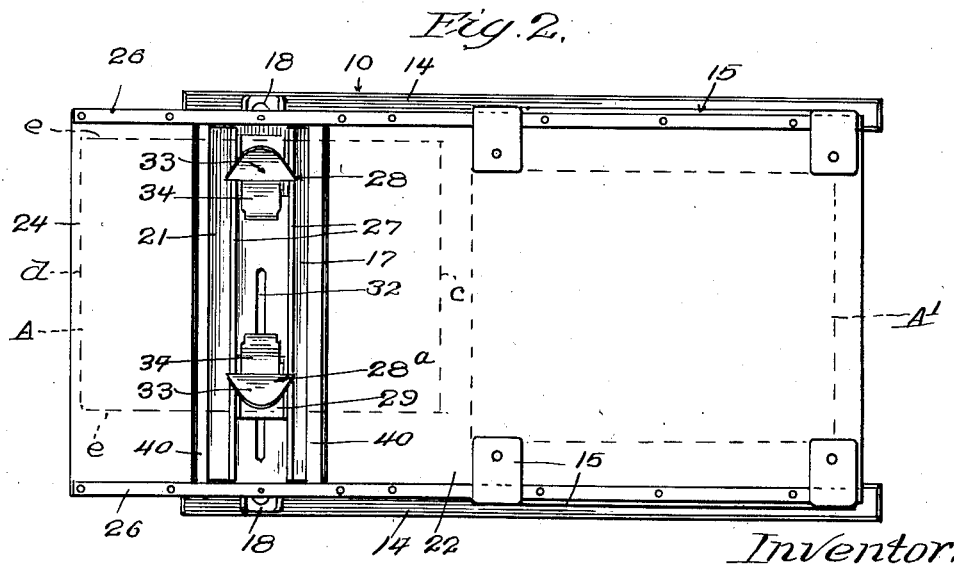
Fig. 2 is a plan of the bread wrapping table.

Referring to said drawings, the reference character 10 designates a stand or frame composed of top pieces 11, legs 12 and braces 13 usually formed of angle iron bars suitably fastened together. Upon the top pieces 11 are rails 14 secured thereto in any desirable manner, and supported by said rails adjacent on end are two side frames 15, upon which is mounted a conventional sealing machine 16.

Supported upon and extending between the rails 14 and the front of the stand is a flat plate 17 having legs 18 at its ends which rest upon and are bolted or otherwise fastened to the rails. Secured to downturned flanges 19 formed at the sides of the plate 17, are upright walls 20, which, with said plate, for a trough 21 that extends crosswise of the table, and is adapted to receive the bread wrappers and loaves of bread during the wrapping operation. The walls 20 are desirably formed as a part of a table 22 which extends lengthwise of the structure from front to back and is suitably secured to flanges 23 formed on and projecting inwardly from the side frames 15. The forward end 24 of the table projects forwardly from the trough and desirably has a downturned flange 25 formed along its forward edge. Extending along the length of the table from front to back adjacent its side edges are ribs 26, riveted or otherwise fastened thereto and said ribs span the gap between the walls 20 and reinforce the table along its edges.

The bottom plate 17 is formed with parallel ribs 27 on its upper side that extend lengthwise of the plate and form supports for the slices of a sliced loaf of bread. Mounted on said plate are two flap folders 28, 28ᵃ, one being stationarily mounted on the plate and one adjustably mounted thereon to accommodate loaves of various lengths. Each flap folder is composed of a channel or U-shaped base 29 (see Fig. 5) fitting between the ribs 27, the base of the flap folder 28 being secured in place by a bolt 30 and wing nut (see Fig. 3) and the other base being secured in any adjusted position by a bolt 31 extending through a slot 32 formed in the plate 17 and having a wing nut on its lower end. Pivotally mounted on each base 29, is a flap folding wing 33, which normally stands in an inclined position, the two wings being oppositely inclined away from each other, to facilitate the insertion of a loaf of bread therebetween. Extending from the lower end of each wing and at right angles thereto is a foot 34 which normally inclines upwards, each foot projecting into the space between the two wings in position to be encountered and depressed by a loaf (when inserted into the trough), thereby causing the wings to be swung towards each other. Desirably, each foot is formed with downturned side flanges 35, through which extends a pin 36 that is secured in the side flanges of the base. The free end of each foot may be curved downwards as at 37 to provide a smooth rounded edge to ride upon the lower side of the loaf. The parts are so proportioned that the wing will normally tend to stand in its inclined position, but I have provided a coiled spring 38 for each wing which encircles the pin 36 and has its two ends engaging the base and wing respectively, and acting to yieldably hold the wing in inclined position. The wings project laterally beyond the side flanges of the bases and their lower protruding edges encounter the upper edges of said flanges and limit the outward swing the wings. The upper edges of the wings are rounded to facilitate the flap folding operation. The angular relation of the wings also serves to make the first fold without any danger of tearing the wrapper, as well as to hold sliced bread in place.

To adjust the flap folders for longer or shorter loaves, the wing nut for the bolt of the flap folder 28ª is backed off, the flap folder adjusted to place and the wing nut screwed back.

When using the table for wrapping narrow loaves, the effective width of the trough may be reduced at its top by the use of two bars 40, spaced apart to meet the requirements and held in place by two cross bars 41 and two thumb screws or bolts and wing nuts 42. The bars 40 are placed between the ribs 26 and the cross bars 41, and the thumb screws or wing nuts 42 tightened up. The use of this auxiliary device is optional and may be dispensed with if desired.

In operation, a stack of bread wrappers A¹ is placed on the table underneath the sealing machine and the attendant removes one of the wrappers from the stack and places it across the trough 21 as seen at A. He then picks up the sliced or unsliced loaf of bread B, inverts it and places it upon the wrapper A directly above the space between the flap folding wings and lowers the loaf into this space, thereby pushing the middle portion of the wrapper down with it, until it encounters and swings down the feet of the wings, which swing the wings towards the ends of the loaf. Fig. 3 shows, in dotted lines, a loaf B (with the wrapper A below it) at the moment the feet are encountered. The protruding ends b of the wrapper encounter the upper edges of the wings and are folded in an upward direction and as the feet are swung down, the wings swing the ends b upward against the ends of the loaf (see Fig. 6), thereby making the first end fold.

The attendant then draws the far end c of the wrapper across the upper side of the loaf, then draws the near end d across the end c overlapping the same (see Fig. 6), and while holding the overlapping parts down with his thumbs, with his fingers he swings down both protruding ends e against the outer sides of the wings (see Fig. 7). In this position, with the fingers, he folds the protruding ends f against the folded ends e, and finally with his thumbs folds the protruding ends g against the folded ends f (see Fig. 8) thus completing the folding operation. In this condition, the attendant lifts the wrapped loaf out of the trough with his fingers pressed against its ends, again inverts the loaf, bringing the top of the loaf uppermost and in this position inserts it into the sealing machine, where the flaps are adhesively secured together.

The wrapping table is especially serviceable in wrapping sliced bread because the flap folders press against the ends of the loaf and hold the slices tightly together during the wrapping operation, thereby making it possible for the attendant to obtain a tighter wrapping than would be the case if the slices were loosely held. Furthermore, the pressure of the flap folders on the ends of the loaf is obtained, automatically by the weight of loaf on the feet of the flap folders.

I claim as new and desire to secure by Letters Patent:

1. A bread wrapping table comprising a table having a trough therein, over which a bread wrapper is placed and into which a loaf of bread and the middle part of the wrapper is inserted, and a pair of end flap folders mounted on the bottom of said trough, and having oppositely disposed normally inclined end flap folding wings, and means, acted upon by the descending loaf of bread, operating to swing said wings toward the ends of the loaf and therewith fold the first folded end flaps against the ends of the loaf.

2. A bread wrapping table comprising a table having a trough therein, over which a bread wrapper is placed and into which a loaf of bread and the middle part of the wrapper is inserted, and a pair of oppositely disposed end flap folders mounted on the bottom of said trough, one of said flap folders being adjustable toward and away from the other, and both having pivotally mounted, normally inclined end flap folding wings, each provided with a foot adapted to be encountered by a descending loaf of bread, whereby to swing the associated wing toward the adjacent end of the loaf and thereby fold up the first folded end flap.

3. A bread wrapping table comprising a table having a trough therein, over which a bread wrapper is placed and into which a loaf of bread and the middle part of the wrapper is inserted, and a pair of oppositely disposed and flap folders mounted on the bottom of said trough, one of said flap folders being adjustable toward and away from the other, and both having pivotally mounted, normally inclined end flap folding wings, each provided with a foot adapted to be encountered by a descending loaf of bread, whereby to swing the associated wing toward the adjacent end of the loaf and thereby fold up the first folded end flap, and a spring associated with each wing for yieldingly holding the wing in its inclined position.

4. A bread wrapping table comprising a table, having a gap therein, a bottom plate below said table underneath said gap, said plate being formed with parallel, horizontal ribs for supporting a sliced loaf of bread, and a pair of end flap folders, having bases mounted on said bottom plate, and normally inclined, oppositely disposed, end flap folding wings pivotally mounted on the bases, said wings having means, engageable by a descending loaf, and adapted to swing the wings toward the ends of the loaf to thereby fold up the first folded end flaps of the wrapper.

5. A bread wrapping table comprising a table having a gap therein, upon which a bread wrapper is placed, a bottom plate supported below said gap, and a pair of flap folders mounted above said bottom plate, each flap folder having a base, and a normally inclined end flap folding wing and foot pivotally mounted on the base with the foot in position to be depressed by a descending loaf, whereby to swing the wing toward the end of the loaf and thereby fold up the first folded end flap against the end of the loaf.

6. A bread wrapping table comprising a table adapted to support a pile of bread wrappers near one end and having a gap near the other end therein, side frames supporting said table and forming supports for supporting a sealing machine above the pile of bread wrappers, a bottom plate supported below said gap in the table, and oppositely disposed end flap folders mounted on said bottom plate in position to fold up the first folded end flaps of a wrapper.

7. A bread wrapping table comprising a table having a gap therein, a bottom plate supported below said gap, a pair of end flap folders mounted above said bottom plate, and adjustably mounted bars located in said gap for varying the width thereof, substantially as and for the purpose set forth.

8. A bread wrapping table comprising a table having a gap therein, a bottom plate supported below the gap, said plate being formed with a pair of spaced bread supporting ribs, and two oppositely disposed end flap folders, each having a base mounted between said ribs, and a combined wing and foot pivoted to said base, the wings normally standing in oppositely inclined positions with the feet in position to be swung down when depressed by a loaf of bread, whereby to swing the wings toward the ends of the loaf.

9. In a bread wrapping table, an end flap folder comprising a U-shaped base, a tiltable normally inclined wing pivotally mounted thereon and having lateral parts overhanging the sides of the base, said wing having a foot extending at right angles thereto and adapted to be swung down by a descending loaf, whereby to swing the wing toward the end of the loaf, and a spring for yieldably holding the wing in its inclined position with the lateral parts thereof engaging the base.

10. A sliced bread wrapping table comprising a table having a gap therein, a bottom plate below said table underneath said gap, said bottom plate having means for supporting a sliced loaf of bread, and a pair of end flap folders having normally inclined, oppositely disposed end flap folding wings fulcrumed upon said plate and having means engageable by a descending loaf and adapted to swing said wings towards the ends of the loaf to thereby fold up the first folded flaps of the wrapper and hold the sliced loaf in place.

11. A sliced bread wrapping table comprising a table having a gap therein, a bottom plate below said table underneath said gap, said bottom plate having means for supporting a sliced loaf of bread, and a pair of end flap folders having normally inclined, oppositely disposed end flap folding wings fulcrumed on said plate and each having a foot rigid with the wing and adapted to be engaged by a descending loaf, whereby to swing the wings against the ends of the loaf, with the end flaps therebetween, and thereby firmly hold the sliced loaf in place during the remainder of the wrapping operation.

FRED MARASSO.